(12) United States Patent
Maeda et al.

(10) Patent No.: US 8,126,288 B2
(45) Date of Patent: Feb. 28, 2012

(54) IMAGE PROCESSING APPARATUS

(75) Inventors: Hisato Maeda, Toyoake (JP);
Yoshimasa Kobayashi, Toyoake (JP);
Nobutoku Motomura, Nasushiobara (JP)

(73) Assignees: A school juridical person Fujita Educational Institution, Toyoake-shi (JP); Toshiba Medical Systems Corporation, Otawara-shi (JP)

( * ) Notice: Subject to any disclaimer, the term of this patent is extended or adjusted under 35 U.S.C. 154(b) by 979 days.

(21) Appl. No.: 12/022,732

(22) Filed: Jan. 30, 2008

(65) Prior Publication Data

US 2008/0181478 A1 Jul. 31, 2008

(30) Foreign Application Priority Data

Jan. 31, 2007 (JP) ................................. 2007-022110
Jan. 9, 2008 (JP) ................................. 2008-002463

(51) Int. Cl.
*G06K 9/36* (2006.01)
*G06K 9/00* (2006.01)

(52) U.S. Cl. ...................................... 382/284; 382/128

(58) Field of Classification Search .................. 382/284, 382/128, 100, 293, 294, 296, 248, 260
See application file for complete search history.

(56) References Cited

U.S. PATENT DOCUMENTS

| 6,883,982 | B2 * | 4/2005 | Tokuda et al. | 400/76 |
| 7,155,048 | B2 * | 12/2006 | Ohara | 382/132 |
| 7,388,974 | B2 * | 6/2008 | Yanagita | 382/128 |
| 2008/0226124 | A1 * | 9/2008 | Seo et al. | 382/100 |
| 2008/0292134 | A1 * | 11/2008 | Sharma et al. | 382/100 |

FOREIGN PATENT DOCUMENTS

JP 2001-59872 3/2001

* cited by examiner

*Primary Examiner* — Yon Couso
(74) *Attorney, Agent, or Firm* — Oblon, Spivak, McClelland, Maier & Neustadt, L.L.P.

(57) ABSTRACT

An image processing apparatus includes a storing section which stores data of a digital image, a rotation processing section which generates a plurality of rotated digital images having different rotation angles from the digital image, an image processing section which generates a plurality of image-processed digital images from the rotated digital images, a reverse processing section which generates a plurality of reversed digital images from the image-processed digital images, and a combining section which combines the reversed digital images into one digital image.

13 Claims, 9 Drawing Sheets

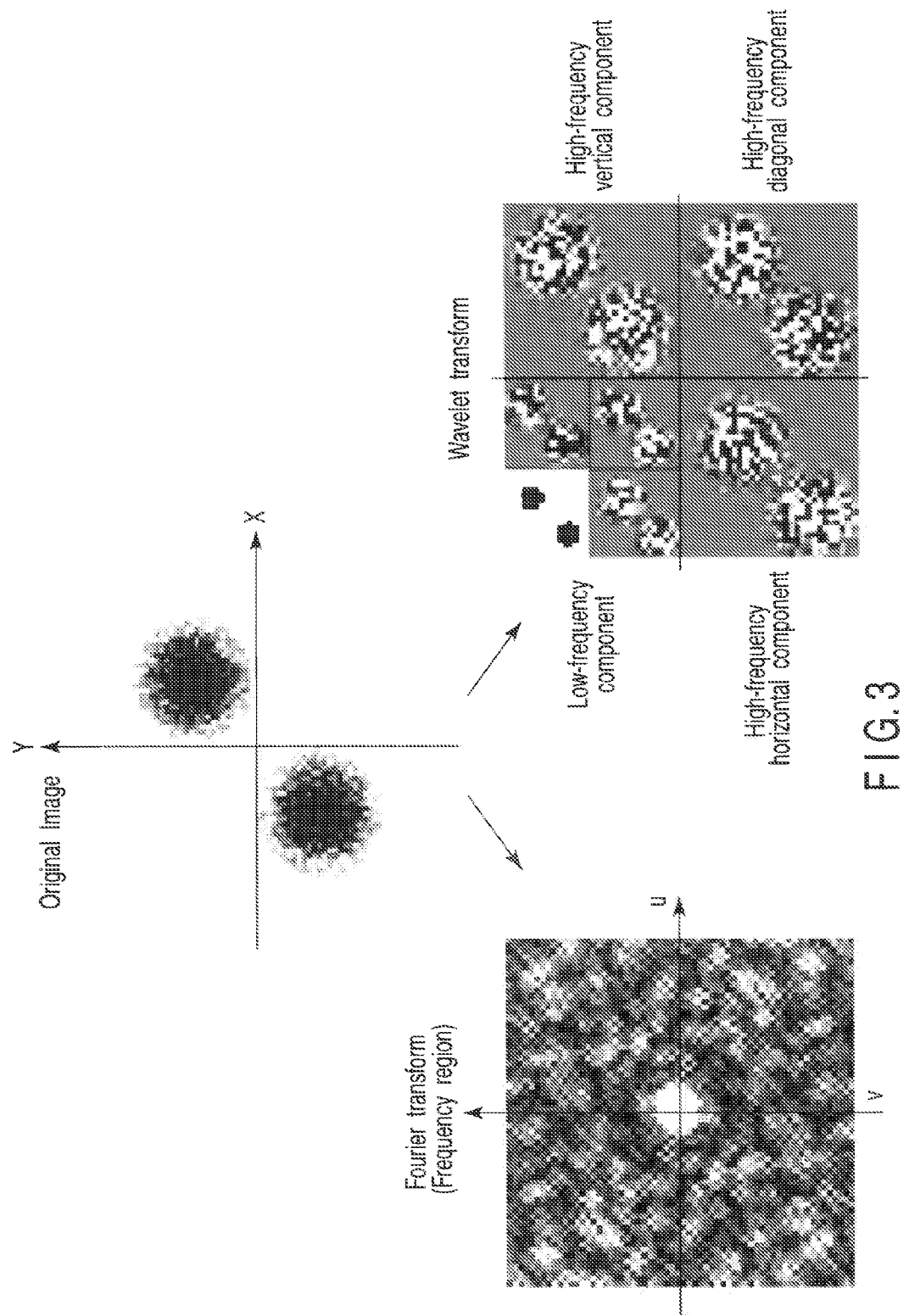
F I G. 3

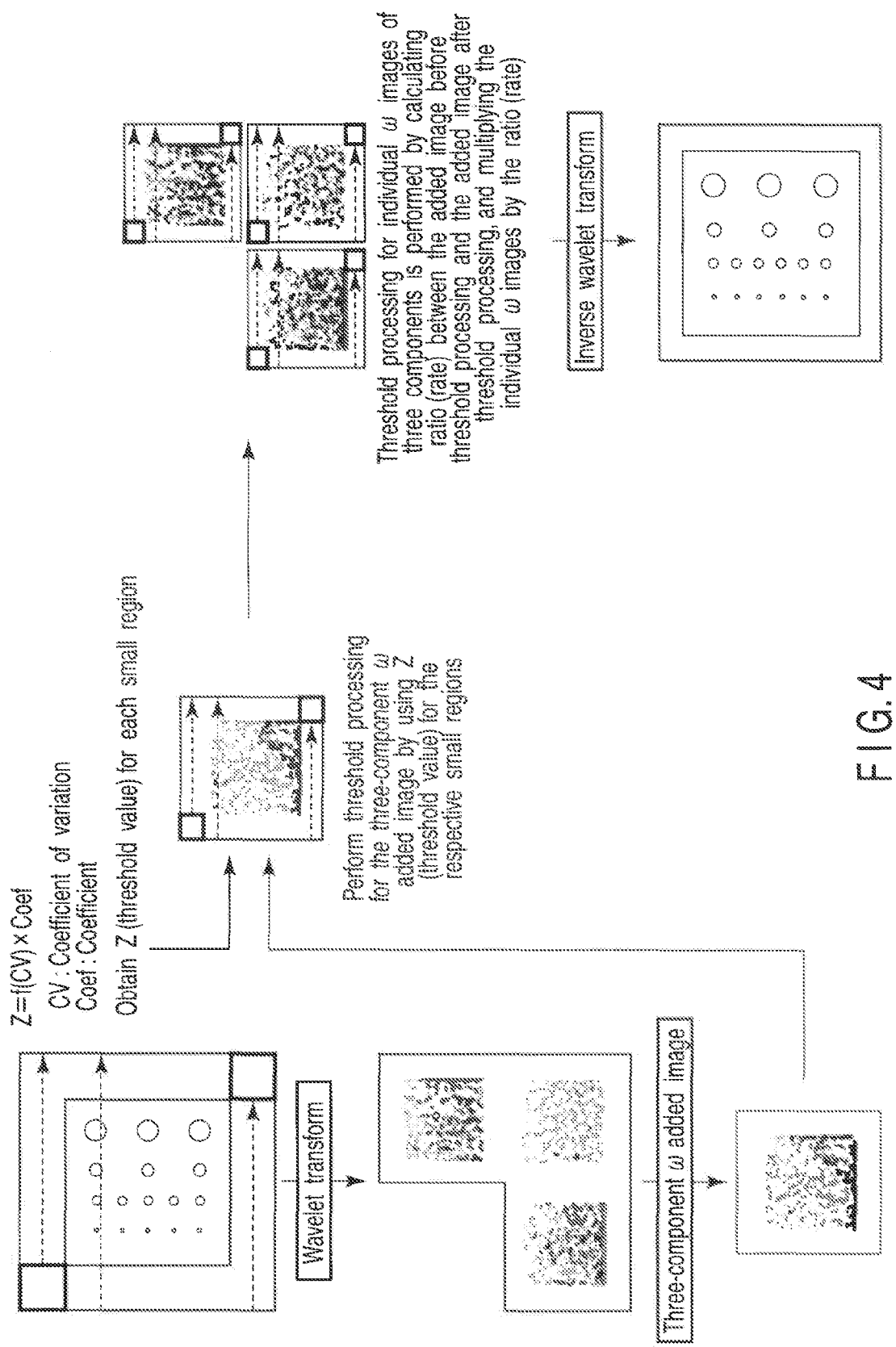
F I G. 4

Rotation of figure

Rotation of axes

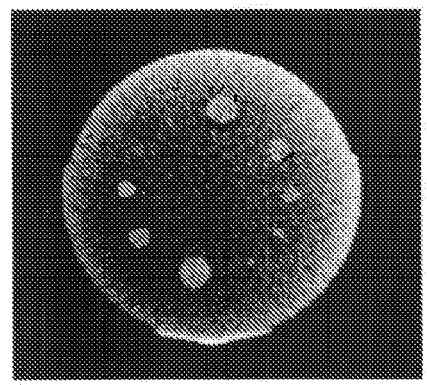
F I G. 10A
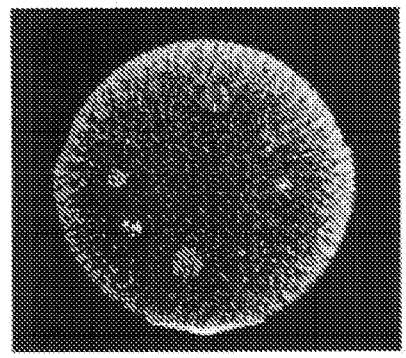
F I G. 10B
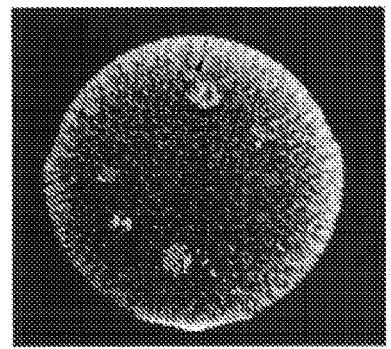
F I G. 10C
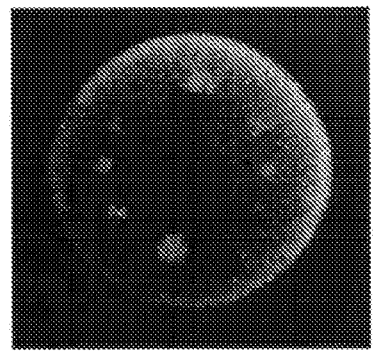
F I G. 10D

IMAGE PROCESSING APPARATUS

CROSS-REFERENCE TO RELATED APPLICATIONS

This application is based upon and claims the benefit of priority from prior Japanese Patent Applications No. 2007-022110, filed Jan. 31, 2007; and No. 2008-002463, filed Jan. 9, 2008, the entire contents of both of which are incorporated herein by reference.

BACKGROUND OF THE INVENTION

1. Field of the Invention

The present invention is applied to digital images. In particular, the present invention relates to an image processing apparatus applied to noise reduction processing for images in which a ratio of signal components to noise components (S/N ratio) locally varies, typically medical diagnostic images such as nuclear medicine images, CT images, and MRI images.

2. Description of the Related Art

Noise reduction in digital images has been performed by cutting off (eliminating) high-frequency components by high-frequency cutoff filters, such as Butterworth filters and Gauss filters. However, since the same high-frequency cutoff processing is performed through the whole image, there is caused a problem that part of information is deteriorated in medical diagnostic images such as nuclear medicine images, CT images, and MRI images, although it causes no problem in general digital images (such as landscape images taken by digital cameras).

The first cause of this problem is that a ratio of signal components to noise components (S/N ratio) locally varies from position to position (from pixel to pixel in minimum unit) in medical diagnostic images. This is because the S/N ratio serving as a total noise of a position varies according to collection counts obtained from each pixel in medical diagnostic images. Therefore, when the same high-frequency component cutting processing is performed through the whole image, overcorrected parts and insufficiently corrected parts are generated according to positions. As a result, the processed image includes regions having deteriorated information (such as spatial resolution and contrast) (overcorrection) and regions in which noise reduction is insufficient (insufficient correction).

The second cause of the problem is that medical diagnostic images have a rough (large) pixel size. For example, spatial resolution of nuclear medicine images is about 10 mm, and the pixel size of images expressing it is several millimeters. When filtering is performed by Fourier transform, there are cases where sufficient sampling is not performed and artifacts are generated, since the pixel size is large. Refer to Jpn. Pat. Appln. KOKAI Pub. No. 2001-59872.

BRIEF SUMMARY OF THE INVENTION

An object of the present invention is to achieve relatively uniform noise reduction processing for images in which the S/N ratio locally varies, or achieve elimination of artifacts caused by noise reduction processing for images having a relatively large pixel size, in noise reduction processing caused by properties of medical diagnostic digital images.

According to an aspect of the present invention, there is provided an image processing apparatus comprising: a storing section which stores data of a digital image; a rotation processing section which generates a plurality of rotated digital images having different rotation angles from the digital image; an image processing section which generates a plurality of image-processed digital images from the rotated digital images; a reverse processing section which generates a plurality of reversed digital images from the image-processed digital images; and a combining section which combines the reversed digital images into one digital image.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a conceptual illustration of wavelet transform.

FIG. 4 is an explanatory diagram illustrating calculation processing of a local cutoff frequency of FIG. 2.

FIG. 10A is a diagram illustrating an example of a phantom image obtained by CT with high current tube as input data of FIG. 2.

FIG. 10B is a diagram illustrating an example of another phantom image obtained by CT with low current tube as input data of FIG. 2.

FIG. 10C is a diagram illustrating an example of the phantom image obtained by CT and subjected to conventional filtering.

FIG. 10D is a diagram illustrating an example of the phantom image obtained by CT and subjected to filtering according to the embodiment.

DETAILED DESCRIPTION OF THE INVENTION

Figure 1:
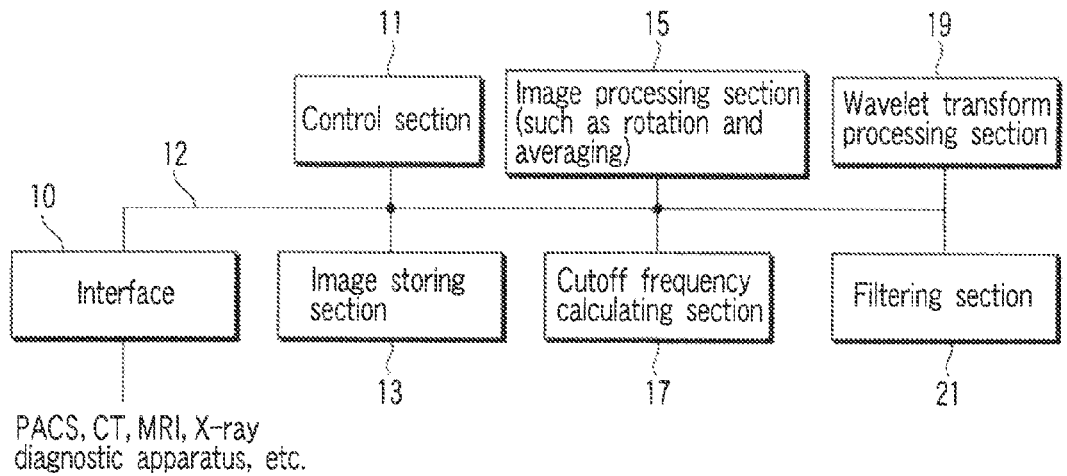
FIG. 1 is a diagram illustrating a structure of an image processing apparatus according to an embodiment of the present invention.

An embodiment of an image processing apparatus according to the present invention is explained below with reference to drawings.

An image processing apparatus according to the embodiment is connected, through an interface 10, to external apparatuses which store or generate data of digital medical images, such as PACS, an X-ray computerized tomography apparatus (CT), a magnetic resonance imaging apparatus (MRI), and an X-ray diagnostic apparatus. An image storing section 13 is provided to store digital image data to be subjected to image processing, which are received from these external apparatuses through the interface 10. A control section 11 which controls operation of the whole apparatus is connected with the interface 10 and the image storing section 13, together with an image processing section 15, a cutoff frequency calculating section 17, a wavelet transform processing section 19, and a filtering section 21, via a data/control bus 12.

The image processing section 15 has a function of subjecting digital images to be image-processed to rotation processing according to a rotation angle instructed from the control section 11, and a function of generating a final filtered digital image by averaging a plurality of digital images filtered by the filtering section 21 according to instructions from the control section 11. The cutoff frequency calculating section 17 calculates a cutoff frequency for each local region of the digital image, on the basis of a standard deviation of each local region, as described below.

The wavelet transform processing section 19 performs wavelet transform processing for digital image data to be image-processed. The wavelet transform processing is processing for expressing a digital image in a frequency space while maintaining spatial information of the original digital image. The filtering section 21 cuts off high-frequency components exceeding the cutoff frequency calculated for each local region by the cutoff frequency calculating section 17, for each local region of the digital image subjected to wavelet transform processing. The filtered digital image is returned to the original actual spatial region by inverse wavelet transform by the wavelet transform processing section 19. A plurality of digital images having subjected to rotation processing with different angles and passed through the filter are subjected to averaging by the image processing section 15.

The above wavelet transform processing can be replaced by Fourier transform which belongs to the same category of frequency analysis processing.

Further, although the above explanation provides that the image processing includes rotation and averaging, the meaning of the term "image processing" is not limited to the above. The term "image processing" has a broad meaning of including at least one of rotation, averaging, frequency analysis, and filtering, etc.

First, an outline of wavelet transform processing is explained. The principle of wavelet transform is defined by the following expression, as widely known.

Basis function $$\Psi_{j,k}(t) = \frac{1}{\sqrt{2^j}} \Psi\left(\frac{1}{2^j}t - k\right)$$

Wavelet transform $$\omega_k^{(j)} = \int_{-\infty}^{+\infty} f(t)\Psi_{j,k}(t)dt = \frac{1}{\sqrt{2^j}} \int_{-\infty}^{+\infty} f(t)\Psi\left(\frac{1}{2^j}t - k\right)$$

Wavelet series $$f(t) = \sum_j \sum_k \omega_k^{(j)} \Psi_{j,k}(t)$$

ψ(t): analyzing wavelet (wavelet)
ω: wavelet expansion series
f(t): object signal
j: level (scaling)
k: shift (parallel displacement)

In the embodiment, as illustrated in FIG. 3, wavelet transform is two-dimensional processing since the object of the processing is an image. As widely known, all elements (components) are transformed into frequency components in Fourier transform, and therefore spatial information is lost. However, wavelet transform can express a digital image in a frequency space with spatial information maintained. For example, the original image is divided into a low-frequency vertical component, a low-frequency diagonal component, a high-frequency vertical component, and a high-frequency diagonal component by two two-dimensional wavelet transforms, and the divided components are displayed.

Figure 2:
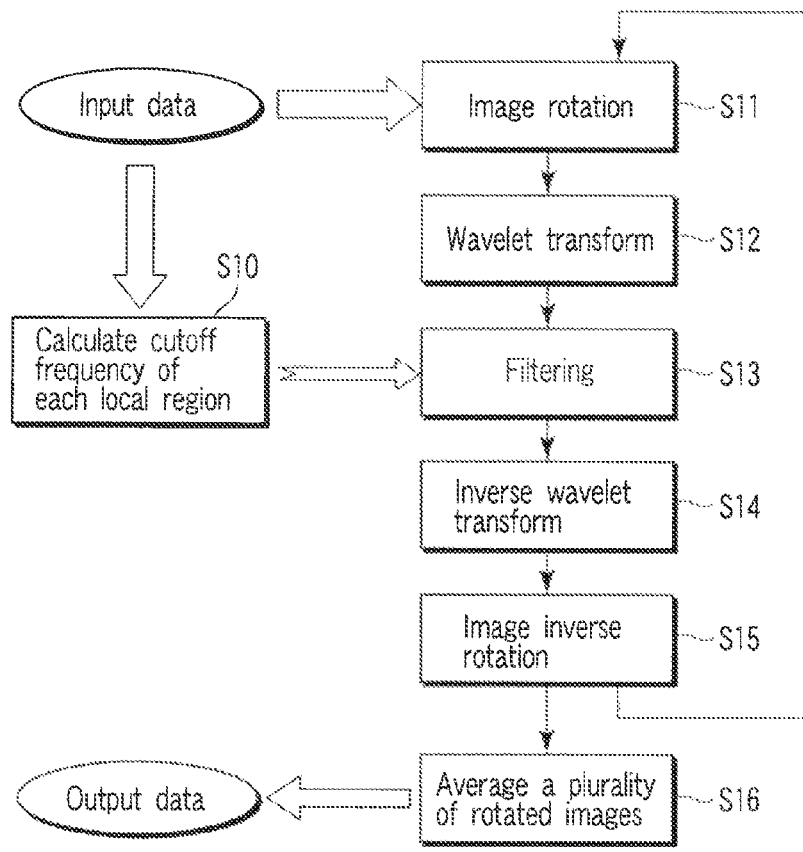
FIG. 2 is a flowchart illustrating a process of noise reduction processing according to the embodiment.

FIG. 2 illustrates a filtering process according to the embodiment. First, in step S10, the cutoff frequency calculating section 17 calculates "cutoff frequency for each local region" used for noise reduction processing (filtering) for digital image subjected to wavelet transform, for the input data (original digital image data).

Figure 5A:
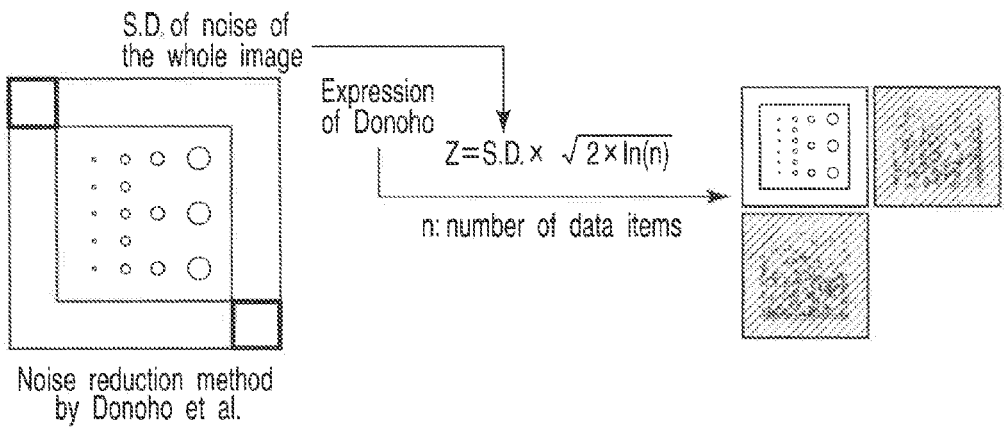
FIG. 5A is a diagram illustrating the former stage of the calculation processing of the cutoff frequency illustrated in FIG. 2.
Figure 5B:
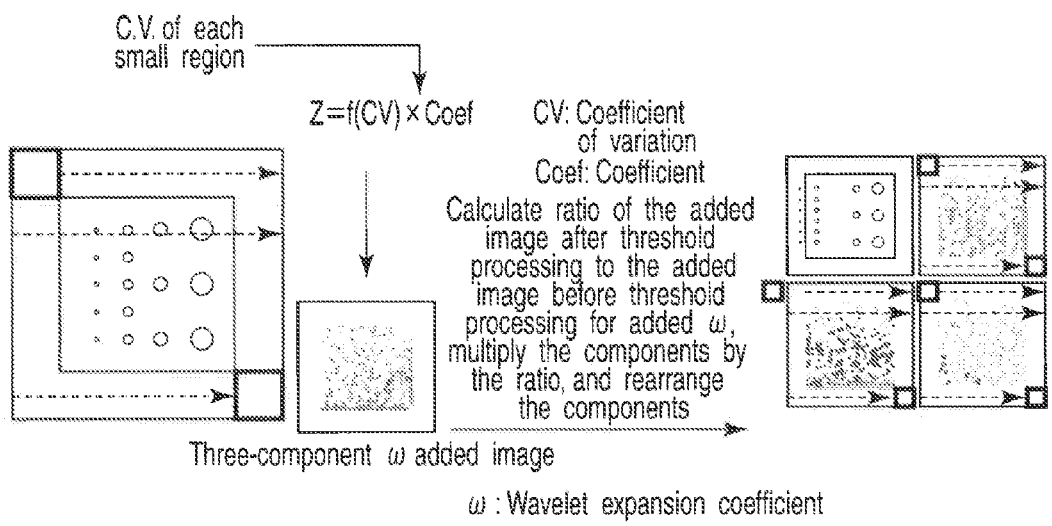
FIG. 5B is a diagram illustrating the latter stage of the calculation processing of the cutoff frequency illustrated in FIG. 2.

FIGS. 5A and 5B illustrate cutoff frequency calculation processing. In noise reduction in conventional wavelet transform, one cutoff frequency is applied to the whole image, without an idea of dividing the image into local regions. A typical example thereof is a method by Donoho, in which a cutoff frequency is determined from a standard deviation of the whole image. In the present embodiment, local regions are determined to obtain local information, and an index indicating the S/N ratio in each local region is determined. In this example, a square having sides of several pixels is adopted as a local region. A cutoff frequency of a local region is determined on the basis of the value C.V. of coefficient of variation in the local region. Processing in local regions is performed through the whole image, and thereby cutoff frequencies for respective local regions in the whole image can be determined.

Specifically, a plurality of local regions are set for the original digital image. A cutoff frequency Z is individually calculated for each of the local regions, based on a standard deviation SD for the local region. More specifically, the calculation is indicated by the following expression.

Z=f(CV)×Coef

CV: Coefficient of variation
Coef: Coefficient
f(CV): SD×(2×ln(n))
n: number of pixels in the local region Return to FIG. 3. In step S11, the original digital image to be processed is subjected to rotation processing with the image center thereof serving as the center, in the image processing section 15. The image is rotated by a designated angle, and subjected to wavelet transform, filtering (noise reduction processing), and inverse wavelet transform. Lastly, the image is inversely rotated by the same designated angle, and returned to the original angle. This processing is performed for each angle being an integral multiple of the designated angle between 0 to 360°. Since the object image is a square matrix, a rotation of 90° can be regarded as being equal to a rotation of 360°. An average image is generated by using all the images processed at the respective angles. This processing enables elimination of artifacts generated in noise reduction processing in images of a large pixel size.

Figure 6:
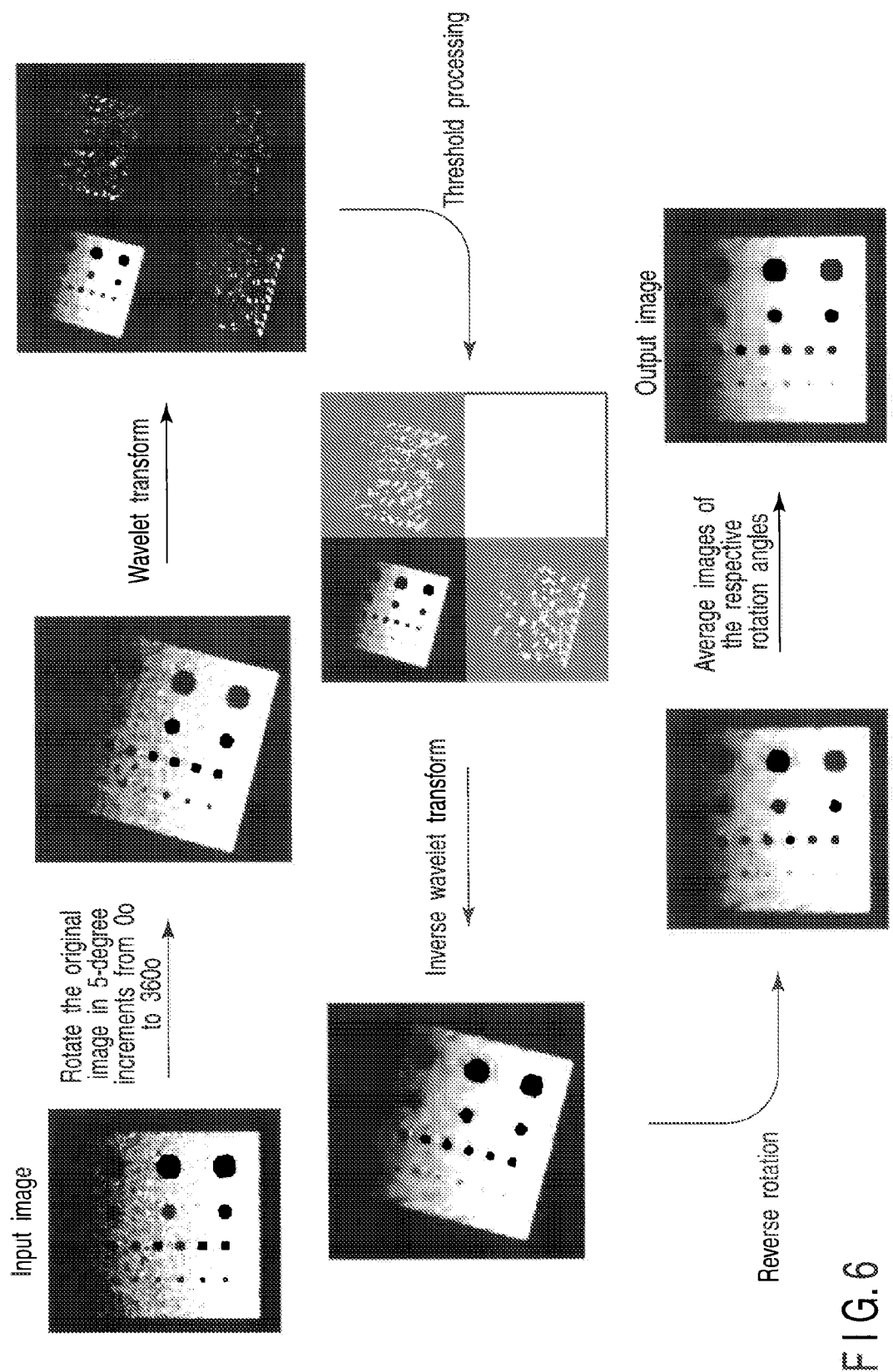
FIG. 6 is a schematic diagram illustrating a process of the noise reduction processing according to the embodiment.
Figure 7A:
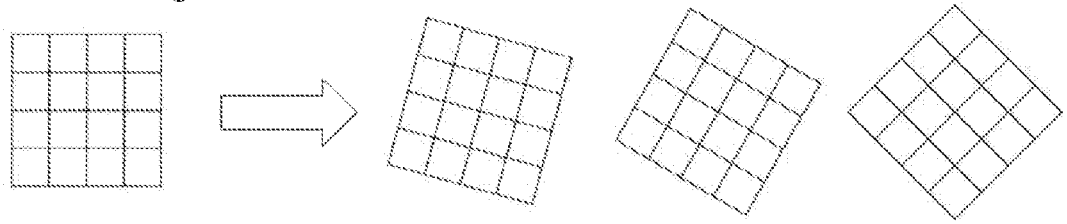
FIG. 7A is an explanatory diagram of image rotation processing of FIG. 3.
Figure 7B:
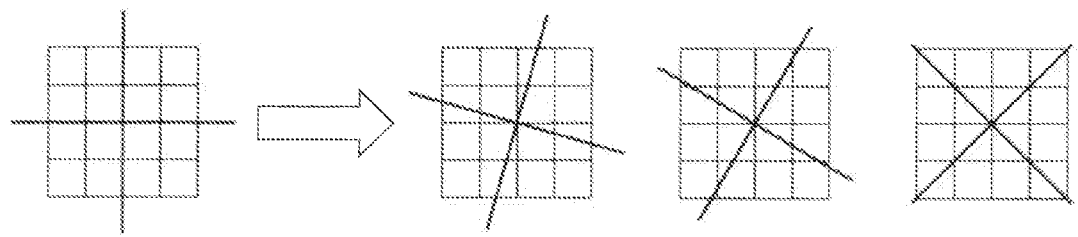
FIG. 7B is an explanatory diagram of another image rotation processing of FIG. 3.

The rotation processing may be rotating the image with the coordinate system fixed as illustrated in FIG. 7A, or may be rotating the coordinate axes in wavelet transform as illustrated in FIG. 7B. The rotation pitch is typically set to 5° as illustrated in FIG. 6. The rotation pitch R is set to any angle selected from a range of $0 < R \leq 45°$. More preferably, the rotation pitch R is set to about 5° ($3 \leq R \leq 10°$).

Figure 11:
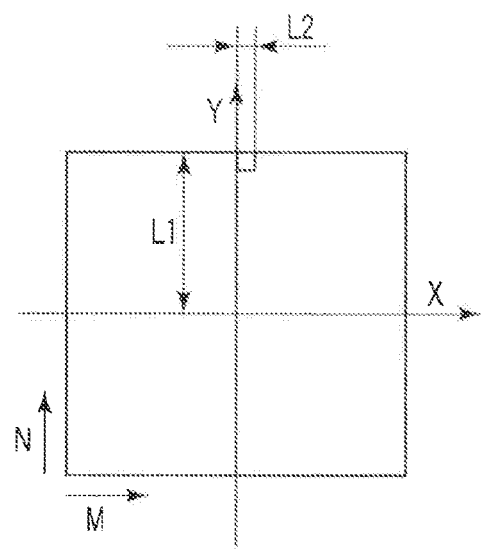
FIG. 11 is a diagram illustrating a standard angle of a rotation pitch of the embodiment.

Further, a standard angle θ of the rotation pitch R is defined as follows. The rotation pitch R is preferably set to n×θ. As illustrated in FIG. 11, n is a positive integer, and has a value which is ½ or less the number of pixels M parallel to the X axis. The value of n should typically be set to 3 or 5, in consideration of balance between the processing amount and the processing effect which have a trade-off relationship.

$$\tan \theta = L2/L1$$

L1: Distance between the center of the image and an edge of the utmost end pixel on the Y axis
L2: Length of a single pixel In the first processing, the rotation angle is 0, that is, the digital image is not rotated. A rotated digital image is subjected to wavelet transform processing in the wavelet transform processing section 19 (step S12).

The local regions of the digital image subjected to wavelet transform processing are subjected to filtering by the filtering section 21 by using the respective cutoff frequencies calculated for the respective local regions in step S10 (step S13). By the filtering, high-frequency components exceeding the cutoff frequencies individually calculated for the respective local regions are eliminated.

Actually, as illustrated in FIGS. 4 and 7, wavelet images (ω images) of three components, that is, the high-frequency vertical component, the high-frequency horizontal component, and the high-frequency diagonal component, obtained by wavelet transform processing, are added. Then, the local regions in the added image are subjected to filtering by the filtering section 21, by using the respective cut-off frequencies calculated for the respective local regions in step S10. The ratio of pixel value between the added image before processing to the added image after processing is multiplied by the wavelet images of the three components, and the components are rearranged in their original positions.

In FIG. 3 again, the digital image subjected to filtering is subjected to inverse wavelet transform processing in the wavelet transform processing section 19 (step S14), and returned to the original actual space region. Then, in step S15, the digital image is rotated in the reverse direction by the same angle as that used in step S1, and returned to the initial angle.

The loop from steps S11 to S15 is repeated predetermined times with the rotation angle in 5-degree increments. Thereby, a plurality of filtered digital images are generated with the rotation angle in 5-degree increments. The filtered digital images are subjected to averaging in the image processing section 15 (step S16).

Figure 8A:
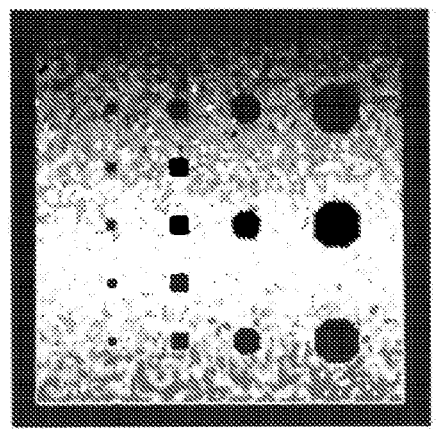
FIG. 8A is a diagram illustrating an example of a phantom image as input data of FIG. 2.
Figure 8B:
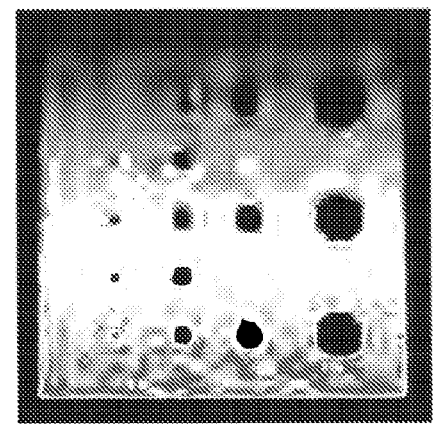
FIG. 8B is a diagram illustrating an example of the phantom image subjected to conventional filtering.
Figure 8C:
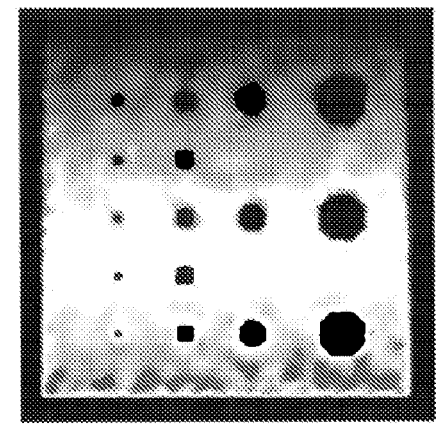
FIG. 8C is a diagram illustrating an example of the phantom image subjected to filtering according to the embodiment.
Figure 9A:
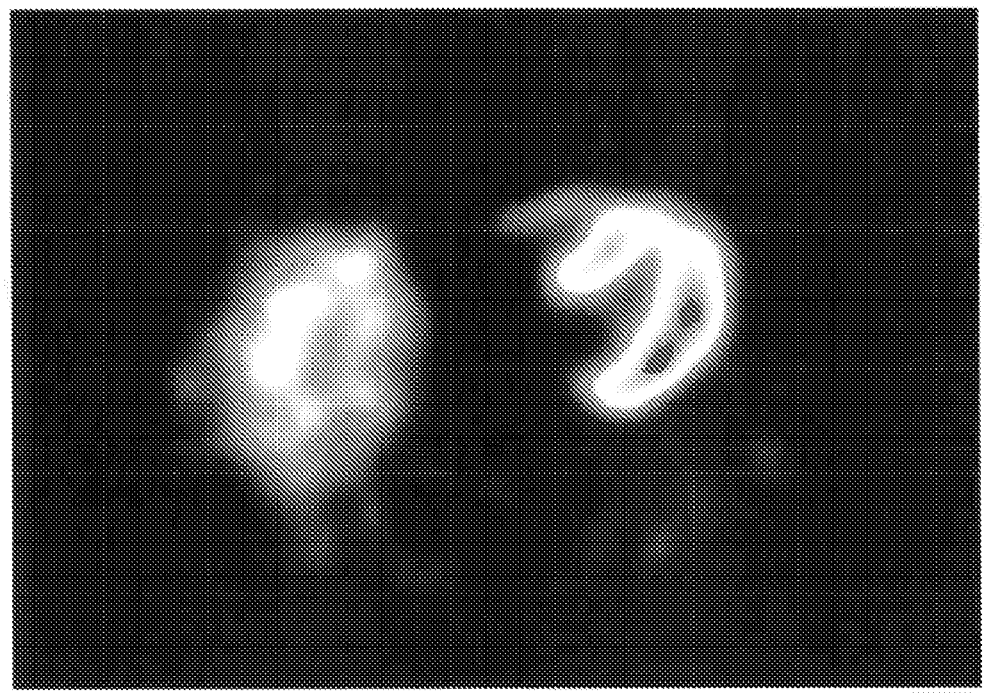
FIG. 9A is a diagram illustrating an example of a SPECT clinical image subjected to conventional filtering.
Figure 9B:
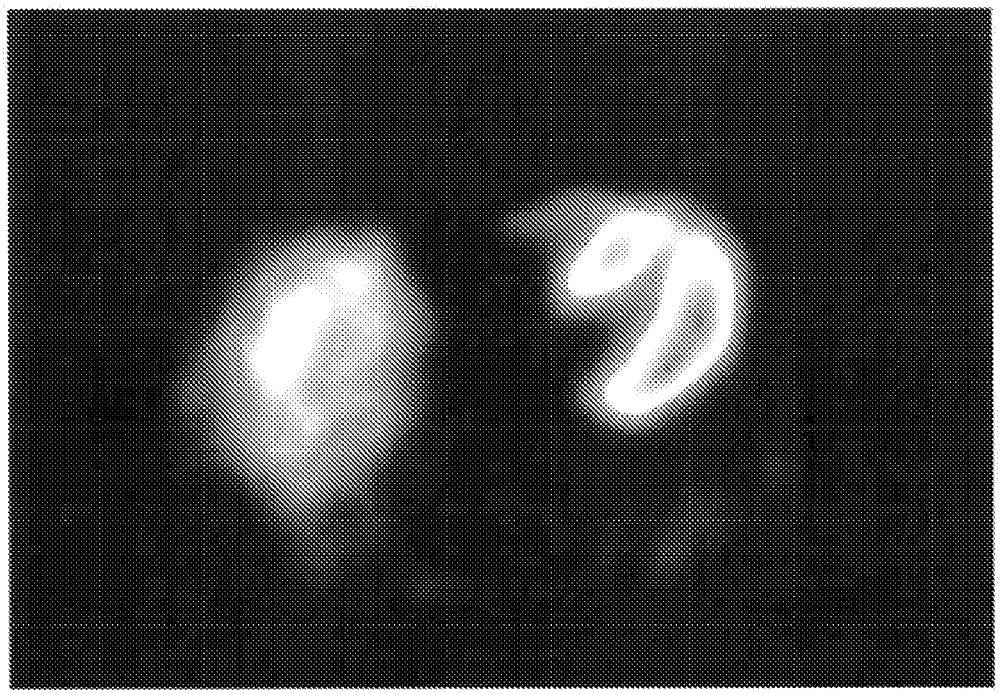
FIG. 9B is a diagram illustrating an example of the SPECT clinical image subjected to filtering according to the embodiment.

FIG. 8A illustrates an example of a phantom image as the input data of FIG. 2, to be compared with the phantom image subjected to conventional filtering illustrated in FIG. 8B, and the phantom image subjected to filtering according to the present embodiment illustrated in FIG. 8C. FIG. 9A illustrates an example of a SPECT (nuclear medicine) clinical image subjected to conventional filtering, and FIG. 9B illustrates an example of the clinical image subjected to filtering according to the present embodiment. FIGS. 10A and 10B illustrate phantom images obtained by CT, FIG. 10D illustrates an example of the phantom image obtained by CT and subjected to filtering according to the present embodiment, and FIG. 10C illustrates an example of the CT phantom image subjected to conventional filtering.

As is clear from comparison of the examples of images, according to the present embodiment, it is possible to achieve relatively uniform noise reduction processing for images in which the S/N ratio locally varies, and eliminate artifacts generated by noise reduction processing for images having a relatively large pixel size.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
   a storing section which stores data of a digital image;
   a rotation processing section which generates a plurality of rotated digital images having different rotation angles from the digital image;
   an image processing section which generates a plurality of image-processed digital images from the rotated digital images;
   a reverse processing section which generates a plurality of original angle digital images from the image-processed digital images by counter rotating each image-processed digital image by a rotation angle used by the rotation processing section to rotate a corresponding digital image; and
   a combining section which combines the reversed digital images into one digital image.

2. An image processing apparatus according to claim 1, wherein the image processing section includes:
   a wavelet transform processing section which subjects the rotated digital images to wavelet transform;
   a filtering section which subjects the digital images subjected to the wavelet transform to filtering by locally different cutoff frequencies; and
   an inverse wavelet transform processing section which subjects the digital images subjected to the filtering to inverse wavelet transform.

3. An image processing apparatus according to claim 2, wherein the image processing section further includes a cutoff frequency calculating section which calculates cutoff frequencies for respective local regions of the rotated digital images, and the filtering section subjects the digital images subjected to the wavelet transform to filtering for each local region by using the corresponding calculated cutoff frequency.

4. An image processing apparatus according to claim 3, wherein the cutoff frequency calculating section calculates each cutoff frequency based on vertical component data, horizontal component data, and diagonal component data of the digital image subjected to the wavelet transform.

5. An image processing apparatus according to claim 3, wherein the cutoff frequency calculating section averages with weights vertical component data, horizontal component data, and diagonal component data of the digital image subjected to the wavelet transform, and calculates a cutoff frequency based on a result of averaging.

6. An image processing apparatus according to claim 1, wherein the image processing section subjects the rotated digital images to filtering.

7. An image processing apparatus according to claim 1, wherein the combining section averages or adds with weights the original angle digital images.

8. An image processing apparatus according to claim 1, wherein the rotation angles of the rotated digital images are different from each other in increments of a predetermined angle.

9. An image processing apparatus according to claim 8, wherein the predetermined angle is selectively set from a range of over 0° and not exceeding 45°.

10. An image processing apparatus according to claim 8, wherein the predetermined angle is 3° to 10°.

11. An image processing apparatus according to claim 8, wherein the predetermined angle is set to $n \times \theta$, n is a positive integer, and has a value ½ or less number of pixels M parallel to an X axis, and the following expression holds: $\tan \theta = L2/L1$ in which L1 is a distance from center of the image to an edge of utmost end pixel on Y axis, and L2 is a length of a single pixel.

12. An image processing apparatus according to claim 11, wherein n is 3 or 5.

13. An image processing apparatus comprising:
a storing section which stores data of a digital image;
a rotation processing section which subjects the digital image to rotation;
a wavelet transform processing section which subjects the rotated digital image to wavelet transform;
a filtering section which subjects the digital images subjected to the wavelet transform to filtering;
an inverse wavelet transform processing section which subjects the filtered digital images to inverse wavelet transform; and
an averaging section which averages a plurality of digital images subjected to the inverse wavelet transform and having different rotation angles in the rotation.

* * * * *